R. A. MEGENITY.

CONCRETE CONSTRUCTION.

APPLICATION FILED JAN. 16, 1920.

Reissued Nov. 8, 1921. 15,221.

Inventor

Ralph A. Megenity

By Emery Perry Blair & Hayes

Attorneys

UNITED STATES PATENT OFFICE.

RALPH A. MEGENITY, OF KANSAS CITY, MISSOURI.

CONCRETE CONSTRUCTION.

15,221. Specification of Reissued Letters Patent. Reissued Nov. 8, 1921.

Original No. 1,280,516, dated October 1, 1918, Serial No. 223,890, filed March 22, 1918. Application for reissue filed January 16, 1920. Serial No. 351,955.

*To all whom it may concern:*

Be it known that I, RALPH A. MEGENITY, a citizen of the United States, and a resident of Kansas City, in the county of Jackson and State of Missouri, have invented an Improvement in Concrete Construction, of which the following is a specification.

My invention relates to improvements in concrete construction.

The object of my invention is to provide novel, simple, cheap and efficient means for securely attaching to concrete walls, veneer facings and fire proof partitions, and for attaching veneer facings to other cementitious bodies, such as piers, columns, beams, posts, lintels and the like.

My invention provides further a novel metal stud, which is durable, cheap to manufacture, which may be easily and securely built in a concrete wall or the like, and which permits of easy attachment thereto of wall ties at any desired height.

My invention provides still further a novel wall tie, which is particularly adapted for use in connection with my improved stud, and which may be easily and quickly attached thereto.

Other novel features of my invention are hereinafter fully described and claimed.

In the accompanying drawing which illustrates the preferred embodiment of my invention.

Similar reference characters designate similar parts in the different views.

Figure 4:
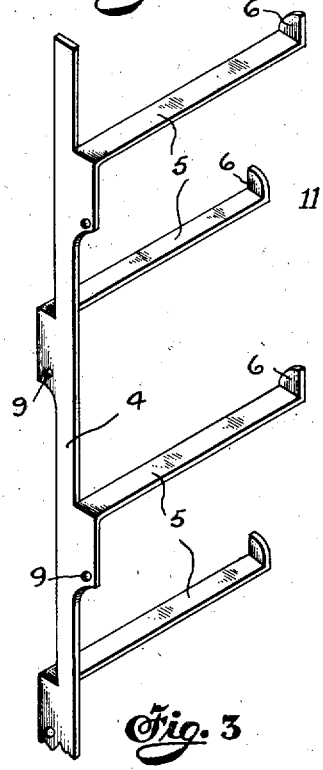
Fig. 4 is an enlarged perspective view of a portion of one of my improved studs.

1 designates a cementitious or concrete body, such as a wall, pier or post of the ordinary type. 2 designates the brick veneer facing laid in cement or mortar 3 and which is attached to the body 1 by means of my improved studs and wall ties.

My improved stud comprises preferably an upright strip of metal 4, such as rolled sheet steel from opposite longitudinal edges of which are cut, respectively two series of tongues which are bent laterally at right angles so as to form inwardly extending anchoring arms 5, each of which is provided at its inner end with a projection 6, extending at right angles thereto.

Figure 2:
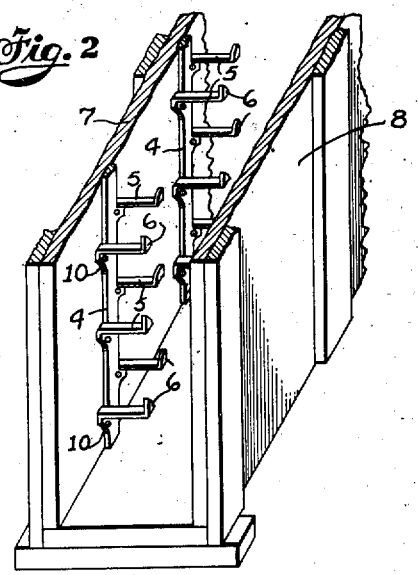
Fig. 2 is a perspective view of a portion of an ordinary wooden wall form to which are shown temporarily attached two of my improved studs, the upper portions of which are broken away.

7 and 8 designate respectively opposite side boards of an ordinary wooden wall form, which may be retained in position for receiving the concrete in any usual manner. Prior to pouring the concrete into the wooden form, the studs 4 are secured in an upright position to the inner sides of the board 7. For temporarily fastening the studs in their proper positions in the form, each stud may be provided with a plurality of holes 9, preferably located respectively below the arms 5 in the wide portions of the stud. The holes 9 receive securing devices, such as nails 10, Fig. 2, which are driven into the board 7.

In order that the strain may be equally distributed, the arms 5 of one series are, preferably, disposed in staggered relationship to the arms of the other series. By cutting the arms 5 from opposite longitudinal edges of the metal strip 4, there is no waste of material. As the arms 5 are integral parts of the strip, they are rigidly connected thereto and will, therefore, be retained in their proper horizontal position, when the concrete is poured into the mold.

After the concrete has been poured into the form or mold, and has become sufficiently set or hardened, the mold boards 7 and 8 are removed, leaving the upright portions 4 of the studs embedded in the wall flush with one side surface thereof.

It is to be noted that the stud or anchor strip illustrated is solid as distinguished from studs which are specifically formed with a hollow interior, opening laterally outward to receive the specially formed securing devices. In the described structure there are no recesses which may become filled with cement to make the device ineffective.

The veneer facing 2 is then laid, and between the desired layers are placed in the mortar or cement 3 my improved wall ties, each of which comprises, preferably, a piece of rod or wire 11 having its ends bent respectively into two reversely disposed arcuate hooks 12, which are, preferably, of like size and which are disposed in the same horizontal plane. Each hook 12 is preferably of sufficient diameter to receive the widest portions of the stud 4. The wall ties may, therefore, be attached at any desired height to the stud 4.

Figure 1:
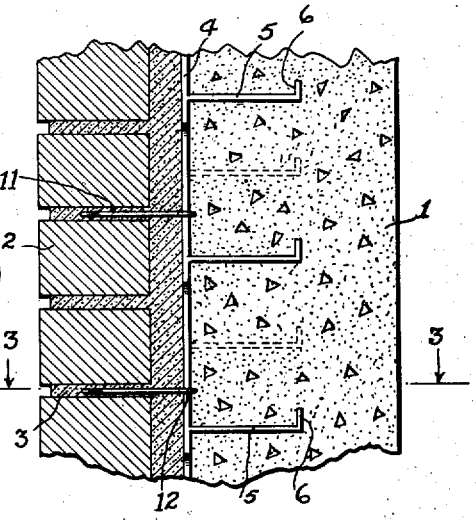
Figure 1 is a vertical sectional view of a portion of a concrete wall and a brick veneer facing attached thereto with my improved studs and wall ties.
Figure 3:
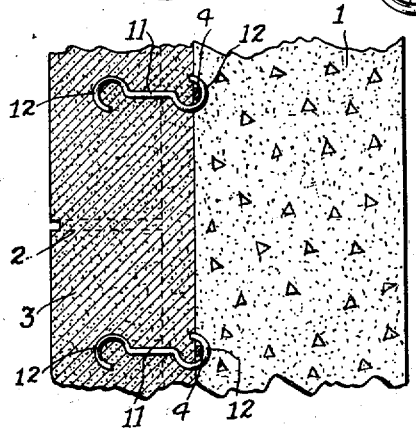
Fig. 3 is a horizontal sectional view on the line 3—3 of Fig. 1.

When the facing 2 has been laid to a height at which it is desired to bond it to the wall 1, holes for receiving the hooks 12 are gouged out of the wall 1 behind the studs 4, and the hooks 12 are then threaded through the holes which have been gouged in the wall so as to respectively embrace the different studs, the wall ties being laid flat-wise upon the uppermost layer of the facing 2, as shown in Figs. 1 and 3.

A layer of motar 3 is then placed upon the top layer of the veneer facing so as to cover the wall ties 11.

The laying of the veneering 2 is then continued until the veneer facing has reached a height at which it is desired to again bond it to the wall 1. At such time, holes are gouged in the wall 1 around the studs 4 to receive the wall ties 11, and the latter are hooked to the studs and laid in cement or mortar on the top of the veneer facing in the manner already described.

By having the hooks 12 of arcuate form, a minimum of material need be gouged out of the concrete wall to enable the workman to thread the hooks around the studs.

By having the wall ties engage the studs intermediate of the anchoring arms 5, and by having the latter arranged in staggered relationship, the strain upon the studs is equalized and a direct pull by the wall ties is insured.

By having the hooks 12 reversely turned and of like size, the pull upon the wall tie is direct and equally divided, and either end of the wall tie may be employed to engage a stud.

Figure 5:
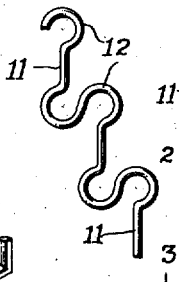
Fig. 5 is a plan view of a rod or wire formed to make a plurality of my improved wall ties.
Figure 6:
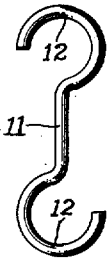
Fig. 6 is an enlarged perspective view of one of my improved wall ties.

The wall ties 11 may be cheaply formed from a single piece of wire or rod, by forming therein a series of portions, each having the shape of the letter S disposed horizontally, as shown in Fig. 5, each S-shaped portion being cut in two, as indicated by the horizontal dotted lines in Fig. 5.

The gage and width of the metal strip 4 and the thickness of the wire or rod used to make the wall ties may be such as shall be required for the particular purpose in view.

I do not limit my invention to the structure shown and described, as modifications within the scope of the appended claims may be made without departing from the spirit of my invention.

I claim as my invention:

1. In concrete construction, the combination with a cementitious body of an anchor strip comprising a solid strip lying along the surface of said body and having anchoring means extending into said body, a facing and a tie-piece extending behind the rear side of the anchor strip and between it and the cementitious body to engage the anchor strip and to secure the facing thereto and thereby to secure the facing to the cementitious body.

2. In concrete construction, a combination with a cementitious body of a flat metal anchor strip lying exposed along the surface of said body and having anchoring means extending into said body, a facing and a tie-piece extending behind the rear side of the anchor strip and between it and the cementitious body and secured to the facing.

3. In a structure of the kind described, a wall, a solid flat upright stud embedded therein at the surface thereof and having anchoring means embedded in the wall, a veneer facing comprising horizontal layers, and a wall tie secured to the facing between the layers and having a hook partly encircling and engaging the rear side of the stud.

4. In concrete construction, the combination with a cementitious body of a stud lying along the surface of the cementitious body and having anchor portions embedded therein and a tie-piece extending behind and around the rear of the stud between it and the cementitious body, and projecting outwardly from the cementitious body to afford attachment for a facing.

5. The method of attaching a facing or other member to a cementitious body which comprises supporting an anchor member upon and along one face of the form work, filling the form with concrete, removing the form work thereby exposing the said anchor strip along the face of the concrete, making an opening for a tie piece behind the anchor strip, introducing a tie piece into said opening, and securing the facing to the tie piece.

In testimony whereof, I have signed my name to this specification this 3rd day of January, 1920.

RALPH A. MEGENITY.